(12) United States Patent
Schwab et al.

(10) Patent No.: US 11,362,749 B2
(45) Date of Patent: *Jun. 14, 2022

(54) SWITCHING SUB-SYSTEM FOR DISTRIBUTED ANTENNA SYSTEMS USING TIME DIVISION DUPLEXING

(71) Applicant: Andrew Wireless Systems GmbH, Buchdorf (DE)

(72) Inventors: Daniel Schwab, Gersthofen (DE); Thomas Kummetz, Kissing (DE); Alfons Dussmann, Gansheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,616

(22) Filed: Feb. 12, 2018

(65) Prior Publication Data

US 2018/0183537 A1 Jun. 28, 2018

Related U.S. Application Data

(63) Continuation of application No. 14/993,848, filed on Jan. 12, 2016, now Pat. No. 10,056,998, which is a
(Continued)

(51) Int. Cl.
*H04J 3/06* (2006.01)
*H04L 5/14* (2006.01)
(Continued)

(52) U.S. Cl.
CPC ............ *H04J 3/0638* (2013.01); *H04B 7/024* (2013.01); *H04L 5/1469* (2013.01); *H04W 24/02* (2013.01);
(Continued)

(58) Field of Classification Search
CPC ..... H04J 3/0638; H04J 3/0685; H04W 24/02; H04W 88/085; H04W 72/0446; H04B 7/024; H04B 7/022; H04L 5/1469
See application file for complete search history.

(56) References Cited

U.S. PATENT DOCUMENTS 6,801,767 B1 10/2004 Schwartz et al.
7,233,771 B2 6/2007 Proctor, Jr. et al.
(Continued)

FOREIGN PATENT DOCUMENTS

CN 1610269 A 4/2005
CN 101019398 A 8/2007
(Continued)

OTHER PUBLICATIONS

State Intellectual Property Office, People's Republic of China, "First Office Action from CN Application No. 201380081799.5 dated Sep. 28, 2018" From Foreign Counterpart of U.S. Appl. No. 14/383,634; pp. 1-10; Published in CN.
(Continued)

*Primary Examiner* — Steven H Nguyen
(74) *Attorney, Agent, or Firm* — Fogg & Powers LLC

(57) ABSTRACT

A switching control module can optimize time division duplexing operations of a distributed antenna system ("DAS"). The switching control module can include a measurement receiver and a processor. The measurement receiver can measure signal powers of downlink signals in a downlink path of the DAS. The processor can determine start times for downlink sub-frames transmitted via the downlink path based on downlink signal powers measured by the measurement receiver exceeding a threshold signal power. The processor can identify a clock setting that controls a timing of switching signals used for switching the DAS between an uplink mode and a downlink mode. The processor can statistically determine a switching time adjust-
(Continued)

ment for the clock setting based on switching time differentials between the clock setting and the start times. The processor can update the clock setting based on the switching time adjustment.

20 Claims, 6 Drawing Sheets

Related U.S. Application Data continuation of application No. 14/383,634, filed as application No. PCT/IB2013/059803 on Oct. 30, 2013, now Pat. No. 9,271,289.

(51) Int. Cl.
| | |
|---|---|
| H04W 72/04 | (2009.01) |
| H04W 88/08 | (2009.01) |
| H04B 7/024 | (2017.01) |
| H04W 24/02 | (2009.01) |
| H04B 7/022 | (2017.01) |

(52) U.S. Cl.
CPC ..... *H04W 72/0446* (2013.01); *H04W 88/085* (2013.01); *H04B 7/022* (2013.01); *H04J 3/0685* (2013.01)

(56) References Cited

U.S. PATENT DOCUMENTS

| | | | |
|---|---|---|---|
| 7,822,148 B2 | 10/2010 | Shapira et al. | |
| 7,979,022 B2 | 7/2011 | Cho et al. | |
| 8,064,822 B2 | 11/2011 | Yang et al. | |
| 8,208,414 B2 | 6/2012 | Singh et al. | |
| 8,310,963 B2 | 11/2012 | Singh | |
| 9,271,289 B2 * | 2/2016 | Schwab | H04L 5/1469 |
| 10,056,998 B2 * | 8/2018 | Schwab | H04L 5/1469 |
| 2003/0117980 A1 | 6/2003 | Kim et al. | |
| 2007/0201402 A1 | 8/2007 | Cho et al. | |
| 2007/0268846 A1 | 11/2007 | Proctor et al. | |
| 2008/0232305 A1 | 9/2008 | Oren et al. | |
| 2009/0316611 A1 * | 12/2009 | Stratford | H04L 27/2656 370/294 |
| 2009/0318089 A1 | 12/2009 | Stratford et al. | |
| 2010/0177669 A1 | 7/2010 | Suo et al. | |
| 2010/0284289 A1 | 11/2010 | Suo et al. | |
| 2011/0182217 A1 | 7/2011 | Schmid et al. | |
| 2011/0201368 A1 | 8/2011 | Faccin et al. | |
| 2011/0263265 A1 | 10/2011 | Caretti et al. | |
| 2012/0087430 A1 | 4/2012 | Forenza et al. | |
| 2012/0134279 A1 | 5/2012 | Tamaki | |
| 2013/0083705 A1 | 4/2013 | Ma et al. | |
| 2013/0094379 A1 | 4/2013 | Xu | |
| 2013/0107763 A1 | 5/2013 | Uyehara et al. | |
| 2013/0121703 A1 | 5/2013 | Kummetz et al. | |
| 2013/0188753 A1 | 7/2013 | Tarlazzi et al. | |
| 2013/0195467 A1 | 8/2013 | Schmid et al. | |
| 2015/0249513 A1 | 9/2015 | Schwab et al. | |
| 2016/0127065 A1 | 5/2016 | Schwab et al. | |

FOREIGN PATENT DOCUMENTS

| | | | |
|---|---|---|---|
| CN | 101291503 A | | 10/2008 |
| CN | 101953023 A | | 1/2011 |
| CN | 102084606 A | | 6/2011 |
| CN | 102084607 A | | 6/2011 |
| CN | 102084614 A | | 6/2011 |
| CN | 102132508 A | | 7/2011 |
| CN | 102160302 A | | 8/2011 |
| CN | 102415194 A | | 4/2012 |
| CN | 102792766 A | | 11/2012 |
| KR | 20020044827 | | 6/2002 |
| WO | 2007/001134 | * | 1/2007 |
| WO | 2010036076 A2 | | 4/2010 |
| WO | 2012075137 A1 | | 6/2012 |
| WO | 2013063025 A1 | | 5/2013 |
| WO | 2015063545 A1 | | 5/2015 |

OTHER PUBLICATIONS

Australian Patent Office, "Examination Report No. 1 for AU Patent Application No. 2013404287 dated Feb. 15, 2018," from foreign counterpart of U.S. Appl. No. 14/383,634, pp. 1-3, AU.
European Patent Office, "Communication Pursuant to Article 94(3) for EP Application No. 13824004.9", Foreign Counterpart to U.S. Appl. No. 14/383,634, dated Jan. 17, 2018, pp. 1-4, Published in: EP.
International Patent Application No. PCT/IB2013/059803, International Search Report and Written Opinion dated Jun. 25, 2014, 9 pages.
International Searching Authority (IB), "International Preliminary Report on Patentability for PCT Application No. PCT/IB2013/059803", Foreign Counterpart to U.S. Appl. No. 14/383,634 dated May 12, 2016, pp. 1-7, Published in: U.S.
United States Patent and Trademark Office, "Notice of Allowance for U.S. Appl. No. 14/383,634", dated Oct. 16, 2015, pp. 1-5, Published in: U.S.
United States Patent and Trademark Office, "Notice of Allowance for U.S. Appl. No. 14/993,848", dated Oct. 12, 2017, pp. 1-5, Published in: U.S.
United States Patent and Trademark Office, "Office Action for U.S. Appl. No. 14/993,848", dated Jun. 22, 2017, pp. 1-28, Published in: U.S.
United States Patent and Trademark Office, "Office Action for U.S. Appl. No. 14/383,634", dated Jun. 24, 2015, pp. 1-10, Published in: U.S.
U.S. Patent and Trademark Office, "Notice of Allowance", From U.S. Appl. No. 14/993,848; dated Apr. 20, 2018; pp. 1-14; Published in U.S.
IP Australia, "Notice of acceptance of patent application from AU Application No. 2013404287 dated Jun. 12, 2018", "from Foreign Counterpart of U.S. Appl. No. 14/383,634", dated Jun. 12, 2018, pp. 1-3: Published in AU.
European Patent Office, "Communication Pursuant to Article 94(3) for EP Application No. 13824004.9", "from Foreign Counterpart to U.S. Appl. No. 14/383,634", dated Jan. 17, 2018, pp. 1-4, Published in: EP.
European Patent Office, "Extended European Search Report from EP Application No. 19171578.8 dated Jul. 23, 2019", from Foreign Counterpart to U.S. Appl. No. 14/383,634, pp. 1-7, Published: US.
State Intellectual Property Office, P. R. China, "Office Action from CN Application No. 201910336377.7 dated Nov. 19, 2021", from Foreign Counterpart to U.S. Appl. No. 15/894,616, pp. 1 through 17, Published: CN.
Australian Government IP Australia, "Examination report No. 1 from AU Application No. 2018229537", from Foreign Counterpart to U.S. Appl. No. 14/383,634, dated Oct. 23, 2019, pp. 1-3, Published: AU.
European Patent Office, "Communication pursuant to Article 94(3) EPC from EP Application No. 19171578.8", from Foreign Counterpart to U.S. Appl. No. 14/383,634, dated Sep. 25, 2020, pp. 1 through 4, Published: EP.
China National Intellectual Property Administration, "First Office Action from CN Application No. 201910336377.7", from Foreign Counterpart to U.S. Appl. No. 14/383,634, dated May 19, 2021, pp. 1 through 23, Published: CN.
Crisp et al., "Novel Time Domain Bias Switching of Radio over Fiber Links for Enchanced Sensitvity in Time Division Duplexed Services", International Topical Meeting on Microwave Photonics (MWP), Oct. 2007, pp. 104 through 107, IEEE.
Fuchao, "Studies on TD-SCDMA system switching and optimization [Research of Handover and Optimization in TD-SCDMA System]", Jan. 12, 2011, pp. 1 through 83, Bejing University of Posts and Telecommunications.

(56) References Cited

OTHER PUBLICATIONS

Vodafone, "LTE TDD UE Maximum Output Power", 3GPP TSG RAN WG4 Adhoc#2, R4-101432, Apr. 2010, pp. 1 through 3, 3GPP, Dublin, Ireland.

* cited by examiner

SWITCHING SUB-SYSTEM FOR DISTRIBUTED ANTENNA SYSTEMS USING TIME DIVISION DUPLEXING

CROSS-REFERENCE TO RELATED APPLICATIONS

This is a continuation of U.S. patent application Ser. No. 14/993,848 filed Jan. 12, 2016 and titled "Switching Sub-System for Distributed Antenna Systems Using Time Division Duplexing," which is a continuation of U.S. patent application Ser. No. 14/383,634, filed Sep. 8, 2014 and titled "Switching Sub-System for Distributed Antenna Systems Using Time Division Duplexing," which is a U.S. national phase application under 35 U.S.C. 371 of International Patent Application No. PCT/IB2013/059803 filed Oct. 30, 2013 and titled "Switching Sub-System for Distributed Antenna Systems Using Time Division Duplexing," the entirety of each of which are incorporated herein by reference.

TECHNICAL FIELD

The present disclosure relates generally to telecommunication systems and more particularly (although not necessarily exclusively) to switching sub-systems for distributed antenna systems using time division duplexing.

BACKGROUND

Telecommunications operators use telecommunication systems to provide signal coverage to coverage zones in which wireless devices are located. A distributed system ("DAS") may be used to extend the coverage of such telecommunication systems. Such distributed antenna systems include signal paths between base stations or other signal sources operated by telecommunication operators and remote antenna units positioned in one or more geographical coverage areas.

In some implementations, a DAS may be configured for time division duplexing ("TDD") operations in which downlink and uplink signals are respectively transmitted and received using at least some common frequencies or common portions of a signal path. A DAS configured for TDD operations may include one or more switches for isolating downlink signal paths from uplink signal paths.

In some cases, multiple telecommunication operators may use the same DAS for extending the coverage of their respective telecommunication systems. An entity responsible for configuring or otherwise operating the DAS may be independent of the telecommunication operators that use the DAS. The entity being independent of the telecommunication operators may present disadvantages. For example, it may be difficult or infeasible to configure the switching operations of the DAS in accordance with the TDD configuration used by the telecommunication operators.

Systems and methods for optimizing TDD switching operations for a DAS are desirable.

SUMMARY

Certain aspects and features of the present disclosure are directed to switching sub-systems for distributed antenna systems using time division duplexing.

In one aspect, a switching control module is provided for optimizing time division duplexing ("TDD") operations of a distributed antenna system ("DAS"). The switching control module can include a measurement receiver and a processor. The measurement receiver can measure signal powers of downlink signals in a downlink path of the DAS. The processor can determine start or end times for downlink sub-frames transmitted via the downlink path based on downlink signal powers measured by the measurement receiver exceeding a threshold signal power. The processor can identify a clock setting that controls a timing of switching signals used for switching the DAS between an uplink mode and a downlink mode. The processor can statistically determine a switching time adjustment for the clock setting based on switching time differentials between the clock setting and the start or end times. The processor can update the clock setting based on the switching time adjustment.

In another aspect, a TDD switching sub-system is provided that can be disposed in a remote antenna unit of a DAS. The TDD switching sub-system can include one or more switches positioned in a downlink path from a master unit to an antenna of the remote antenna unit or an uplink path from the antenna to the master unit. The switches can selectively connect the antenna of the remote antenna unit to the uplink path or the downlink path. The TDD switching sub-system can also include a measurement receiver communicatively coupled to the downlink path. The measurement receiver can measure downlink signal power in the downlink path. The TDD switching sub-system can also include a processor that is communicatively coupled to the measurement receiver and switches. The processor can determine start or end times for downlink sub-frames transmitted via the downlink path based on downlink signal powers measured by the measurement receiver exceeding a threshold signal power. The processor can identify a clock setting that controls a timing of switching signals used for switching the DAS between an uplink mode and a downlink mode. The processor can statistically determine a switching time adjustment for the clock setting based on switching time differentials between the clock setting and the start or end times. The processor can update the clock setting based on the switching time adjustment.

In another aspect, a method is provided for optimizing switching times for a DAS that is configured for TDD operations. The method can involve identifying a clock setting that controls the timing of switching signals provided to one or more switches positioned in an uplink path or a downlink path of the DAS. The switching signals can instruct the switches to switch the DAS between an uplink mode and a downlink mode. The method can also involve determining start or end times for downlink sub-frames transmitted via the downlink path. Each start or end time can be determined based on a measured signal power in the downlink path exceeding a threshold signal power. The method can also involve updating the clock setting based on a switching time adjustment that is statistically determined from multiple switching time differentials. Each switching time differential can include a respective difference between the clock setting and a respective one of the start or end times.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
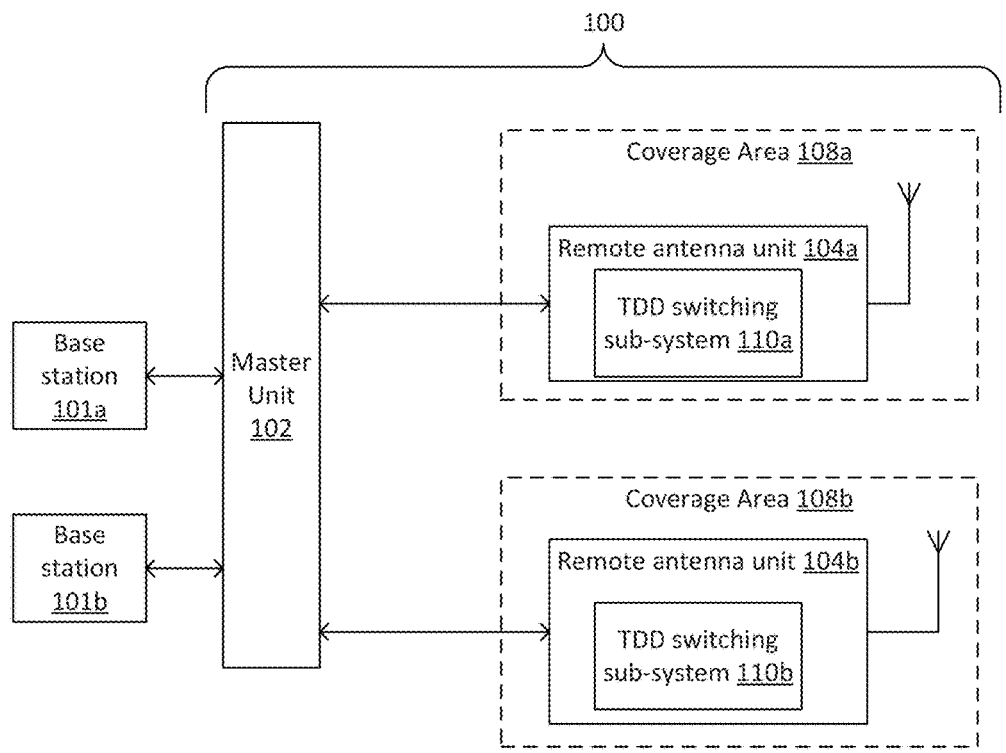
FIG. 1 is a block diagram depicting an example of a distributed antenna system having a time-division duplex ("TDD") switching sub-system according to one aspect of the present disclosure.

Certain aspects and examples are directed to switching sub-systems for a distributed antenna system ("DAS") configured for time division duplexing ("TDD") operations. For example, the DAS can use a switching sub-system to switch between an uplink mode for communicating TDD signals in an uplink direction and a downlink mode for communicating TDD signals in a downlink direction. The switching sub-system can automatically determine switching times for the DAS based on determining whether a signal level for downlink signals exceeds a threshold level. One or more switches of the switching sub-system can switch a remote antenna unit of the DAS to the downlink mode by selectively connecting one or more components of the downlink path in the remote antenna unit and disconnecting one or more components of a corresponding uplink path in the remote antenna unit.

In accordance with some aspects, the switching sub-system can include a switching control module that detects the downlink/uplink ratio of base stations in communication with the DAS. The switching control module can determine an initial clock setting based on the downlink/uplink ratio. The initial clock setting can determine the timing for sending command signals to the switches of the switching sub-system that instruct the switches to switch the DAS between an uplink mode and a downlink mode.

The switching control module can also optimize a clock setting that controls switching times for the switches. Optimizing the switching times can maximize or otherwise improve data throughput via the DAS. The switching control module can optimize the clock setting by determining start or end times for respective downlink sub-frames transmitted via the downlink path. The switching control module can determine the start or end times based on when signal power measurements for the downlink path exceed a threshold signal power. The switching control module can statistically determine a switching time adjustment based on a set of switching time differentials between the initial clock setting and the determined start or end times for the downlink sub-frames. For example, the switching time adjustment may be the statistical mean of the set of switching time differentials. The switching control module can update the clock setting based on the switching time adjustment.

The switching control module can be used to automatically determine a TDD configuration for one or more telecommunication operators using the DAS. Automatically determining the TDD configuration can reduce or eliminate the need for manual configuration of the DAS with respect to each telecommunication operator. Reducing or eliminating the need for manual configuration of the DAS can reduce or avoid problems resulting from missing information with respect to the configuration settings of different telecommunication operators. The switching control module can also compensate for uplink or downlink pulsing variation or other deficiencies components of the DAS in the uplink or downlink direction, such as a jitter or clock frequency drift experienced by one or more reference clock devices in the DAS.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a block diagram depicting an example of DAS 100 having a TDD switching sub-system 110 according to one aspect. The DAS 100 can include a master unit 102 in communication with remote antenna units 104a, 104b and with base stations 101a, 101b. In some aspects, different base stations can communicate signals associated with different telecommunication operators. The DAS 100 can be positioned in a geographical area (e.g., a stadium, an office building, etc.) to extend wireless communication coverage of the base stations 101a, 101b into geographical coverage areas 108a, 108b.

The DAS 100 or other telecommunication system can include downlink paths for transporting downlink signals from the base stations 101a, 101b to one or more of the remote antenna units 104a, 104b. The DAS 100 can receive downlink signals from the base stations 101a, 101b via a wired or wireless communication medium. Downlink signals can include signals provided from the base stations 101a, 101b and transmitted by the remote antenna units 104a, 104b in the coverage areas 108a, 108b. A non-limiting example of a remote antenna unit is a universal access point.

The DAS 100 or other telecommunication system can also include uplink paths for transporting uplink signals from one or more of the remote antenna units 104a, 104b to one of more of the base stations or repeaters. Uplink signals are signals at frequencies in an uplink frequency band that are recovered or otherwise received by one or more of the remote antenna units 104a, 104b from communication devices in the coverage areas 108a, 108b.

The master unit 102 can communicate signals between the base stations 101a, 101b and the remote antenna units 104a, 104b. An example of a master unit 102 is a wireless conversion station. The master unit 102 and remote antenna unit(s) 104a, 104b can communicate via any suitable communication medium. The communication medium can be any suitable medium for providing a serial communication link between the master unit 102 and the remote antenna unit 104a, 104b. In some aspects, the communication medium can be an optical fiber. In other aspects, the communication medium can include copper cables, microwave links, etc. The master unit 102 and remote antenna units 104a, 104b can include analog-to-digital and digital-to-analog converters for digital communication over a serial link.

For illustrative purposes, FIG. 1 depicts a single master unit 102 in communication with two base stations 101a, 101b and two remote antenna units 104a, 104b. However, a distributed antenna system 100 can include any number of master units and any number of remote antenna units for communicating signals between any number of base stations or other signal sources and any number of coverage areas.

A DAS 100 can include other devices in addition to master units, remote antenna units, and extension units. For example, in some aspects, the DAS 100 may include a base station router or other interface device that receives signals from base stations 101a, 101b and provides the signals to the master unit 102. In other aspects, the DAS 100 may include one or more extension units that communicate signals between the master unit 102 and the remote antenna units 104a, 104b.

The DAS 100 can be configured for TDD operations that support multiple operators communicating signals via the DAS 100. For example, the DAS 100 can switch between an uplink mode for communicating TDD signals in an uplink direction and a downlink mode for communicating TDD signals in a downlink direction.

The remote antenna units 104a, 104b can respectively include TDD switching sub-systems 110a, 110b used to connect components of the downlink path in response to detecting downlink signals having signal levels exceeding a threshold level. The TDD switching sub-systems 110a, 110b can analyze downlink signals to determine if signal levels for the downlink signals exceed specified threshold levels. Each of the TDD switching sub-systems 110a, 110b can include switches that switch a respective one of the remote antenna units 104a, 104b to the downlink mode by selectively connecting one or more components of the downlink path in the remote antenna unit and disconnecting one or more components of a corresponding uplink path in the remote antenna unit.

Figure 2:
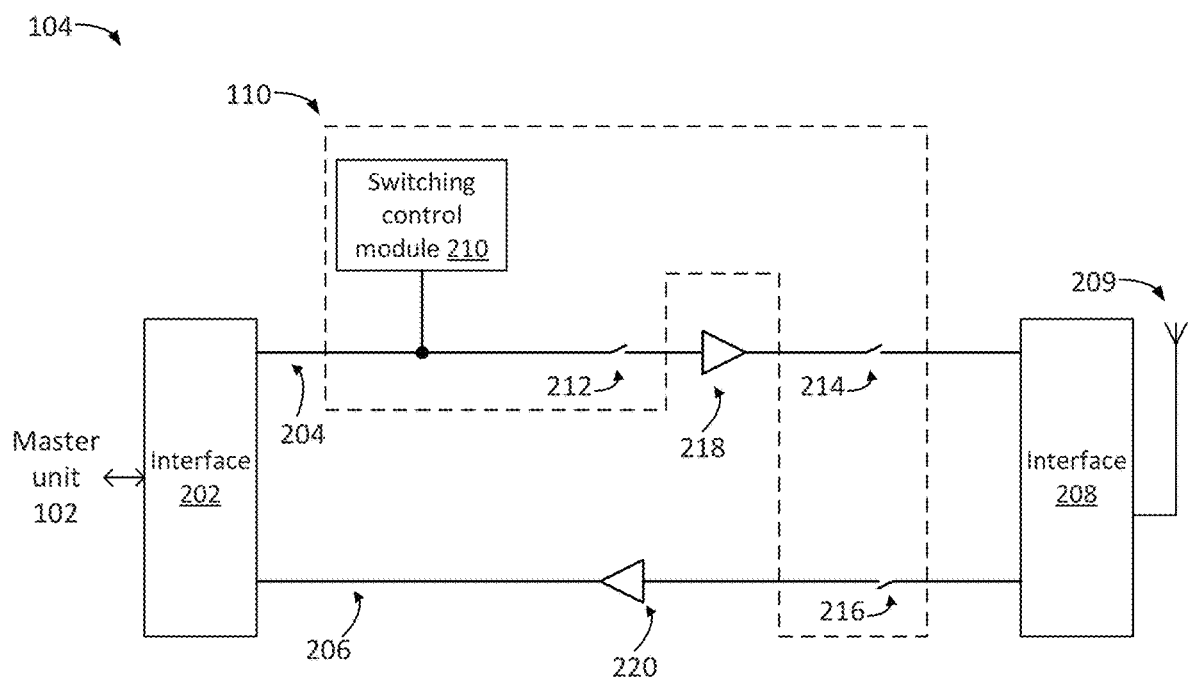
FIG. 2 is a block diagram depicting an example of a remote antenna unit with a TDD switching sub-system according to one aspect of the present disclosure.

FIG. 2 is a block diagram depicting an example of a remote antenna unit 104 with a TDD switching sub-system 110 according to one aspect. In a downlink direction, downlink signals received from the master unit 102 via an interface 202 can traverse a downlink path 204 and can be coupled to an antenna 209 via an interface 208 for transmission to communication devices in a coverage area. In an uplink direction, uplink signals received by the antenna 209 can be coupled to an uplink path 206 via the interface 208 and can traverse the uplink path 206 for transmission to the master unit 102 via the interface 202.

The TDD switching sub-system 110 can include one or more components of the downlink path 204 and the uplink path 206. For example, FIG. 2 depicts a TDD switching sub-system 110 that includes a switching control module 210, switches 212, 214 in the downlink path 204, and a switch 216 in the uplink path 206. The switching control module 210 can be coupled to the downlink path 204 in any suitable manner. The switch 212 can be positioned in the downlink path 204 between the interface 202 and a power amplifier 218. The switch 214 can be positioned in the downlink path 204 between the power amplifier 218 and the interface 208. The switch 216 can be positioned in the uplink path 206 between the interface 208 and a low noise amplifier 220.

The switching control module 210 can control the operation of the switches 212, 214, 216 to selectively allow communication of downlink signals via the downlink path 204 or uplink signals via the uplink path 206. The switching control module 210 can control the switches 212, 214, 216 by sending switching signals to the switches 212, 214, 216 or devices actuating the switches 212, 214, 216 (not depicted in FIG. 2). The switching control module 210 can be communicatively coupled to the switches 212, 214, 216 or devices actuating the switches 212, 214, 216 via any suitable mechanism. For example, the remote antenna unit 104 may include a printed circuit board or other communication bus via which switching signals from the switching control module 210 can provided to the switches 212, 214, 216 or devices actuating the switches 212, 214, 216. For downlink transmission, the switching control module 210 can provide switching signals that cause the switches 212, 214 to be closed and the switch 216 to be opened, thereby completing the downlink path 204 between the interfaces 202, 208 and opening the uplink path 206 between the interfaces 202, 208. For uplink transmission, the switching control module 210 can provide switching signals that cause the switches 212, 214 to be opened and the switch 216 to be closed, thereby opening the downlink path 204 between the interfaces 202, 208 and completing the uplink path 206 between the interfaces 202, 208. Any suitable switches 212, 214, 216 can be used. Non-limiting example of suitable switches 212, 214, 216 include RF switches, RF attenuators, digital attenuators in a digital signal path, digital switches interrupting a digital signal in a digital signal path, etc.

Although FIG. 2 depicts the switching control module 210 as a separate module coupled to the downlink path 204 for illustrative purposes, other implementations are possible. In some aspects, the downlink path 204 may include one or more digital signal processing components, such as a processing device (e.g., an application-specific integrated circuit ("ASIC"), a field-programmable gate array ("FPGA"), etc.) The functions of the switching control module 210 can be performed by the processing device using digital downlink signals in the downlink path 204 between the interfaces 202, 208.

Figure 3:
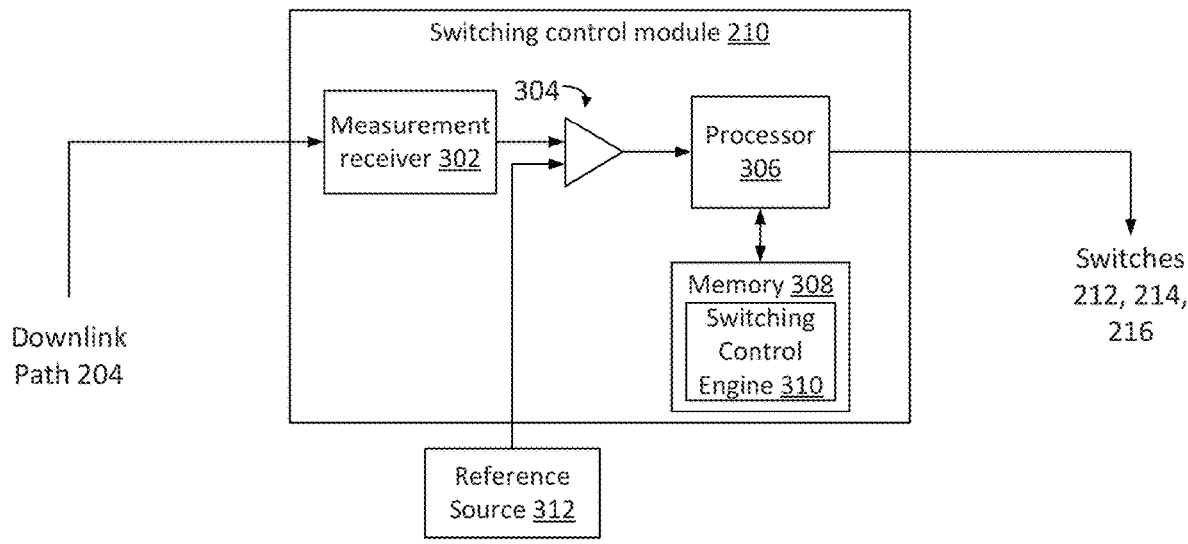
FIG. 3 is a block diagram depicting an example of a switching control module of the TDD switching sub-system of FIG. 2 according to one aspect of the present disclosure.

The switching control module 210 can provide switching signals based on a detection of downlink signals in the downlink path 204, an internal clock, or a combination thereof. For example, FIG. 3 is a block diagram depicting an example of the switching control module 210 according to one aspect. The switching control module 210 can detect the downlink/uplink ratio of the base stations 101a, 101b of other signals sources. The switching control module 210 can determine an initial clock setting for the TDD switching sub-system based on the downlink/uplink ratio. The initial clock setting can determine the timing of sending switching signals to the switches 212, 214, 216. The switching control module 210 can optimize switching times for the switches 212, 214, 216. Optimizing the switching times can maximize or otherwise improve data throughput via the DAS 100.

The switching control module 210 can include a measurement receiver 302, a comparator 304, and a processor 306 communicatively coupled to a memory 308.

The measurement receiver 302 can include any suitable device for measuring a signal power level in the downlink path 204. A non-limiting example of a measurement receiver 302 is a power detector. The measurement receiver 302 can be coupled to the downlink path 204 in any suitable manner, such as (but not limited to) a directional coupler.

The comparator 304 can include a first input coupled to an output of the measurement receiver 302 and a second input coupled to a reference source 312. The measurement receiver 302 can provide a voltage or current representative of a signal power measurement for the downlink path 204 to the first input of the comparator 304. The reference source 312 can provide a voltage or current representative of a threshold signal power to the second input of the comparator 304. The comparator 304 can compare the representative voltages or currents for the downlink signal power measurement and the threshold signal power. The comparator 304 can output a voltage or current representative of whether the downlink signal power measurement exceeds the threshold signal power. The threshold signal power can be modified by modifying the voltage or current provided by the reference source 312.

The processor 306 can receive the voltage or current representative of whether the downlink signal power measurement exceeds the threshold signal power. The processor 306 can control switching operations of the TDD switching sub-system 100 based on the comparison of the downlink signal power measurement and the threshold signal power by executing a switching control engine 310 or other executable instructions stored to the memory 308, as described in further detail below. The processor 306 can control the switching operations by generating switching signals that are provided to the switches 212, 214, 216 or the devices used for actuating the switches 212, 214, 216.

The processor 306 can include any device or group of devices suitable for accessing and executing executable instructions stored in the memory 308. Non-limiting examples of the processor 306 include a microprocessor, an ASIC, a FPGA, or other suitable processing device. The processor 306 may include one processor or any number of processors. The memory 308 may be any non-transitory computer-readable medium capable of tangibly embodying executable instructions and can include electronic, magnetic, or optical devices. Examples of memory 308 include random access memory ("RAM"), read-only memory ("ROM"), magnetic disk, an ASIC, a configured processor, or other storage device. Instructions can be stored in memory 308 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

Although FIG. 3 depicts a switching control module 210 including a comparator 304 for outputting a signal indicative of whether the downlink signal power exceeds a threshold signal power, other implementations are possible. For example, in some aspects, the comparator 304 and the reference source 312 can be omitted. The processor 306 can communicate with the measurement receiver 302 to obtain data describing signal power levels in the downlink path 204. In one non-limiting example the measurement receiver 302 can have an analog output electrically connected to the processor 306. The measurement receiver 302 can provide a voltage or a current to the processor 306 via the analog output. The voltage or current can be equivalent to or otherwise indicative of the measured power level in the downlink path 204. In another non-limiting example, the measurement receiver 302 can provide a digital output signal to the processor 306 that represents the measured power level in the downlink path 204. In additional or alternative aspects, the measurement receiver 302 can include a digital input that is coupled to the downlink path 304.

The processor 306 can compare the data obtained from the measurement receiver 302 with data stored in the memory 308 that describes the threshold signal power. The threshold signal power can be modified by providing updated data describing the threshold signal power to the processor 306 for storage in the memory 308.

Figure 4:
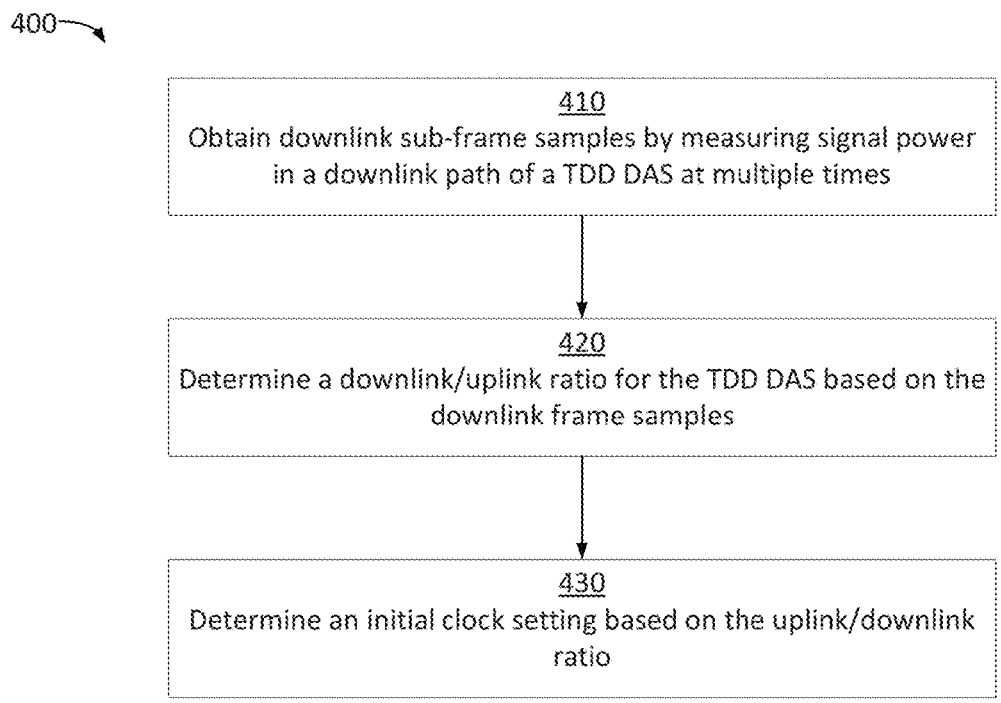
FIG. 4 is a flow chart depicting an example of a process for determining an initial clock setting for the switching control module according to one aspect of the present disclosure.

FIG. 4 is a flow chart depicting an example of a process 400 for determining an initial clock setting for the switching control module 210 according to one aspect. For illustrative purposes, the process 400 is described with respect to the implementation of the TDD switching sub-system 110 and the switching control module 210 described above with respect to FIGS. 2-3. Other implementations, however, are possible.

The process 400 can be used to automatically determine a TDD configuration for one or more telecommunication operators using the DAS 100. Automatically determining the TDD configuration can reduce or eliminate the need for manual configuration of the DAS 100 with respect to each telecommunication operator. Reducing or eliminating the need for manual configuration of the DAS 100 can reduce or avoid problems resulting from missing information with respect to the configuration settings of different telecommunication operators.

The process 400 involves obtaining multiple downlink frame samples by measuring signal power in a downlink path of a TDD DAS at multiple times, as depicted in block 410. For example, the processor 306 can execute the switching control engine 310 to sample data from the measurement receiver 302 or the comparator 304 at intervals specified by the switching control engine 310. For each interval, the processor 306 can store data in the memory 308 describing whether the signal power in the downlink path 204 exceeds the threshold power. The signal power in the downlink path 204 exceeding the threshold power can indicate that a downlink frame is being transmitted via the downlink path 204. The signal power in the downlink path 204 being less than or equal to the threshold power can indicate that a downlink frame is not being transmitted via the downlink path 204 and that an uplink frame is being transmitted via the uplink path 206. In some aspects, the measurement receiver 302 can measure the signal power in the downlink path 204 at intervals specified by the processor 306. In other aspects, the measurement receiver 302 can continuously measure the signal power in the downlink path 204. The processor 306 can sample power measurements from measurement receiver 302 or sample current or voltage levels at the output of the comparator 304 at the specified intervals.

The process 400 further involves determining a downlink/uplink ratio for the TDD DAS based on the downlink frame samples, as depicted in block 420. For example, the switching control engine 310 can access data describing different downlink/uplink ratios for different TDD configurations. Different TDD configurations may communicate TDD signals in a specified ratio between the uplink and downlink sub-frames. A frame can be a period of time a TDD system switches between sending uplink and downlink data in according to a specified sequence. A frame can include uplink sub-frames during which uplink data is transmitted and downlink sub-frames during which uplink data is transmitted. The downlink/uplink ratio can include the number of individual downlink and uplink sub-frames and the duration of each sub-frame.

The process 400 further involves determining an initial clock setting for the switching control module 210 based on the downlink/uplink ratio, as depicted in block 430. For example, the processor 306 can execute the switching control engine 310 to determine the initial clock setting. The clock setting can be used to determine when the processor 306 provides a switching signal to the switches 212, 214, 216. For example, the processor 306 can provide the switching signal every $t_{clk}$ seconds, milliseconds, microseconds, or other suitable unit of time. The value of $t_{clk}$ used for the clock setting can correspond to the TDD configuration of a telecommunication operator using the DAS 100. An initial value of $t_{clk}$ can be selected based on a TDD configuration determined from the downlink/uplink ratio.

A TDD configuration of a base station using the DAS 100 can be determined by identifying downlink sub-frames and uplink sub-frames during a TDD frame can be used to determine. A downlink/uplink ratio can correspond to a given TDD configuration. For example, an LTE system configured for TDD operation can include a first configuration with a ratio of two downlink sub-frames to three uplink sub-frames, a second configuration with a ratio of three downlink sub-frames to two uplink sub-frames, a third configuration with a ratio of four downlink sub-frames to one uplink sub-frames, etc. In some aspects, the switching control engine 310 can select a TDD configuration based on a standardized downlink/uplink ratio in a telecommunication standard, such as a 3rd Generation Partnership Project ("3GPP") specification. Selecting the TDD configuration based on a standardized downlink/uplink ratio in a telecommunication standard can minimize or otherwise reduce errors with respect to incorrect switching intervals. In other aspects, the switching control engine 310 can be configured via user input with one or more specified TDD configurations corresponding to one or more specified downlink/uplink ratios.

The switching control engine 310 can compare the downlink/uplink ratio determined using the measurement receiver 302 to data stored to the memory device that describes various TDD configurations. The switching control engine 310 can identify the TDD configuration for an operator using the DAS 100 based on the comparison of the determined downlink/uplink ratio with the stored data describing various TDD configurations. The switching control engine 310 can select an initial value for $t_{clk}$ that causes the processor 306 to send switching signals to the switches 212, 214, 216 in accordance with the identified TDD configuration.

In some aspects, the DAS 100 can be set to an offline mode for performing the process 400. For example, the DAS 100 may be automatically set to an initialization mode upon entering operation. An initialization or other offline mode can be used to set one or more system parameters of the DAS 100 used for TDD operation. In an offline mode, the switching control module 210 may perform one or more configuration operations based on signal power measurements in the downlink path 204 without controlling the switches 212, 214, 216. For example, in an offline mode, the switches 212, 214, 216 may be set to an open position such the DAS 100 does not communicate signals between the base stations 101a, 101b and the coverage areas 108a, 108b.

Figure 5:
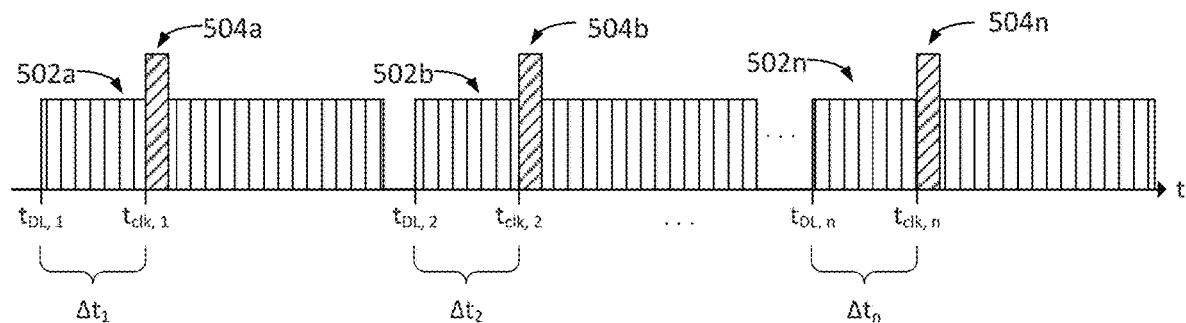
FIG. 5 is a graph depicting examples of switching time differentials between downlink sub-frames and switching signals provided according to an initial clock setting according to one aspect of the present disclosure.

The initial clock setting $t_{clk}$ may roughly approximate the TDD configuration for an operator using the DAS 100. However, slight discrepancies may exist between the times at which downlink sub-frames begin and the times at which the switching control module 210 provides switching signals to the switches 212, 214, 216. For example, FIG. 5 is a graph depicting examples of switching time differentials between downlink sub-frames 502a-n and switching signals 504a-n provided according to an initial clock setting according to one aspect. Each of the switching time differentials is a delay between the start of a respective one of the downlink sub-frames 502a-n and a time at which a respective one of the switching signals 504a-n is provided to the switches 212, 214, 216.

The switching control module 210 can optimize or otherwise improve the clock setting $t_{clk}$ based on a switching time adjustment $\Delta t_{adj}$ statistically determined from a set of switching time differentials $\Delta t_n$. For example, for one or more of the downlink sub-frames 502a-n, the processor 306 can compare each of the clock settings $t_{clk,1\ldots n}$ with a respective one of the times $t_{DL,1\ldots n}$ at which a downlink signal power greater than a threshold signal power is detected by the switching control module 210.

The processor can determine each switching time differential $\Delta t_n = |t_{clk,n} - t_{DL,n} - t_{offset}|$. The offset value $t_{offset}$ can be a configurable static offset between the switching point determined by the measurement receiver 302 and the point in time when the switching point is required to be set. The switching control module 210 can be configured to detect a threshold signal power that is substantially higher than the noise in the downlink path 204, thereby maintaining a high signal-to-noise ratio and a low statistical variance. The offset value $t_{offset}$ can be used if it is desirable to switch between the uplink and downlink mode prior to the signal power in the downlink path 204 exceeding the high threshold signal power. The offset value $t_{offset}$ can be selected based on the threshold signal power used by the switching control module 210, the telecommunication standard used for downlink signals in the downlink signal path 204, the use of the DAS 100 by multiple operators, or the transmission of multi-channel signals via the DAS 100. In some aspects, the switching time differential $\Delta t_n$ can be determined without using an offset value $t_{offset}$.

The statistical variation of a determined switching point over time can be caused by one or more processes in combination with one another. One non-limiting example of a source of the variation is the signal-to-noise level of the signal measured by the measurement receiver 302. Another non-limiting example of a source of variation is the jitter and drift of a reference clock used by the switching engine 310 or other clocks in DAS 100 or the base stations 101a, 101b. Another non-limiting example of a source of variation is noise in the associated with the reference source 312. Another non-limiting example of a source of variation is that high power uplink signals can be coupled to the downlink path 204 due to missing isolation between the uplink and downlink paths at the master unit 102. The various source of variation can combine with one another to cause a statistical variation in the switching point.

Figure 6:
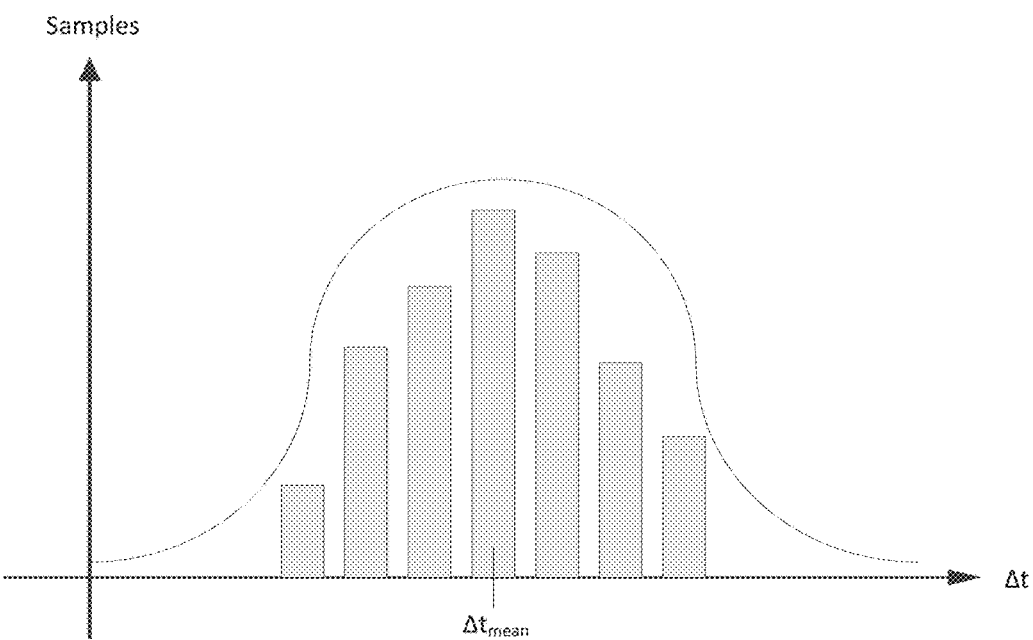
FIG. 6 is a graph depicting an example of a statistical distribution of switching time differentials used to find a switching time adjustment according to one aspect of the present disclosure.

FIG. 6 is a graph depicting an example of a statistical distribution of switching time differentials $\Delta t_n$ used to find a switching time adjustment $\Delta t_{adj}$. Sampled values for $\Delta t_n$ can be obtained over different frames in which an operator using the DAS 100 switches between an uplink mode and a downlink mode. The switching control engine 310 can generate or otherwise obtain a statistical distribution of the sampled values for $\Delta t_n$. The switching control engine 310 can determine the switching time adjustment $\Delta t_{adj}$ based on the statistical distribution. A non-limiting example of a switching time adjustment $\Delta t_{adj}$ statistically determined from sampled values for $\Delta t_n$ is a mean value $\Delta t_{mean}$ of the sampled values for $\Delta t_n$, as depicted in FIG. 6.

Figure 7:
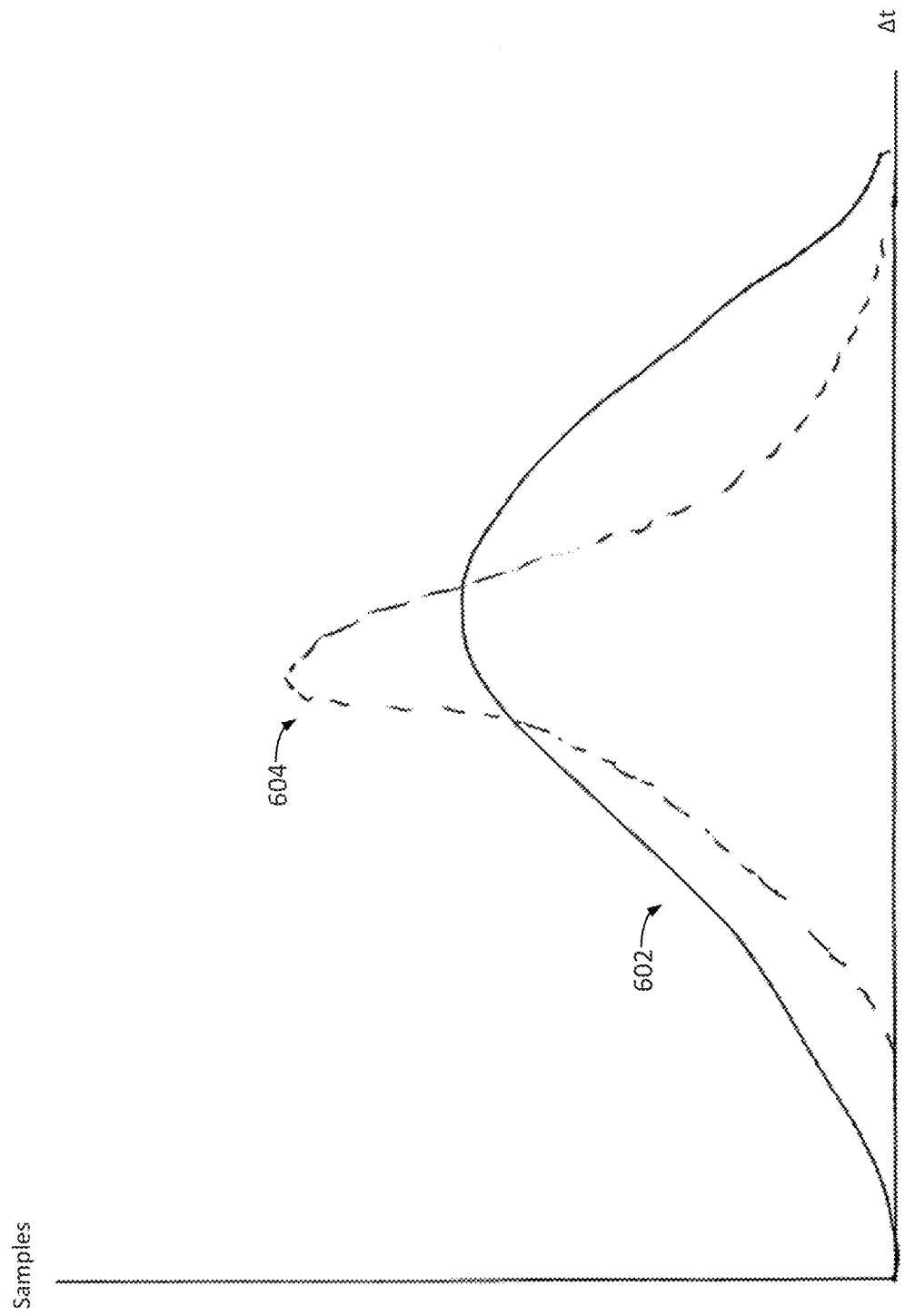
FIG. 7 is a graph depicting examples of statistical distributions of switching time differentials affected by a signal-to-noise level in the downlink path according to one aspect of the present disclosure.

The signal-to-noise level in the downlink path 204 can impact the statistical distribution of the sampled values of $\Delta t_n$. For example, FIG. 7 is a graph depicting examples of statistical distributions of switching time differentials $\Delta t_n$ affected by a signal-to-noise level in the downlink path 204. A statistical distribution 602 of switching time differentials $\Delta t_n$ represented by the solid line may obtained from a downlink path 204 having a lower signal-to-noise ratio than the statistical distribution 604 represented by the dashed line. The lower signal-to-noise ratio can cause the statistical distribution 602 of switching time differentials $\Delta t_n$ to have a wider range of values than the statistical distribution 604.

FIGS. 6-7 depict symmetrical or nearly symmetrical statistical distributions of the sampled values of $\Delta t_n$. However, in some aspects, the statistical distribution of the sampled values of $\Delta t_n$ may be asymmetrical. For example, the statistical distribution may be wider for earlier times and narrow for later times due to the higher signal level.

Figure 8:
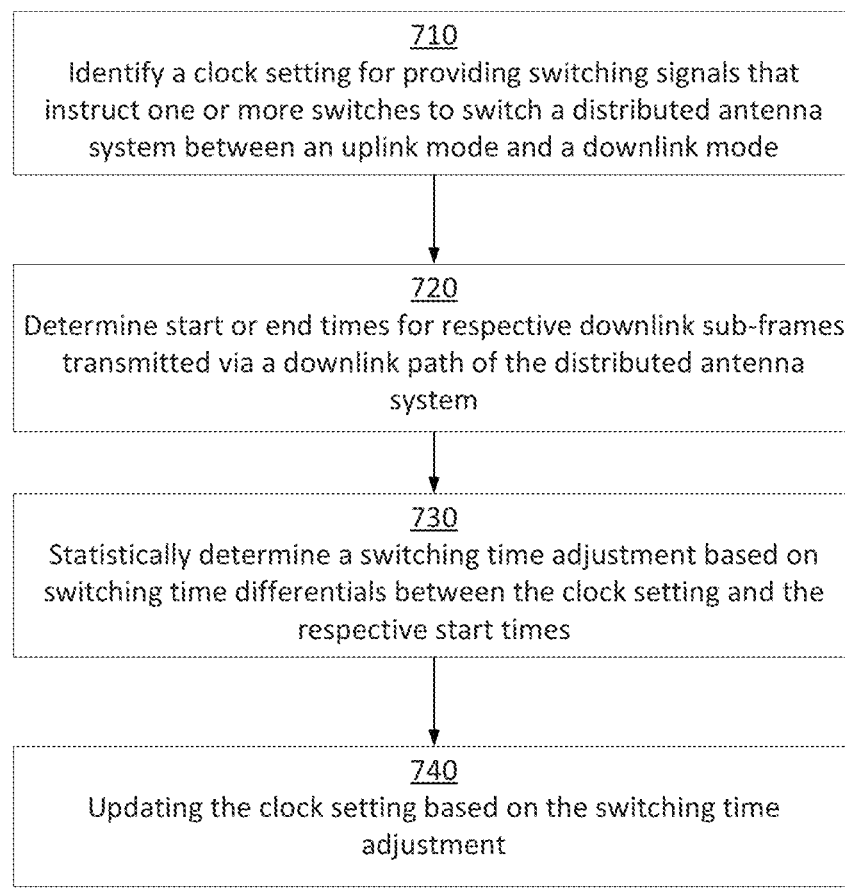
FIG. 8 is a flow chart depicting an example of a process for determining an optimized clock setting for the switching control module according to one aspect of the present disclosure.

The switching control module 210 can use a switching time adjustment $\Delta t_{adj}$ to optimize or otherwise improve the clock setting used by the switching control module 210. FIG. 8 is a flow chart depicting an example of a process for determining an optimized clock setting for the switching control module according to one aspect.

The process 700 involves identifying a clock setting that controls timing for providing switching signals to one or more switches that instruct the switches to switch the distributed antenna system between an uplink mode and a downlink mode, as depicted in block 710. For example, the switching control engine 310 executed by the processor 306 can determine a clock setting for providing switching signals to one or more of the switches 212, 214, 216.

In some aspects, identifying the clock setting can include identifying an initial clock setting for the switching control module 210, such as (but not limited to) a clock setting determined using a process 400. For example, the clock setting can be determined or otherwise identified during an offline mode for the DAS 100 in which no switching signals are provided to the switches 212, 214, 216.

In other aspects, the identified clock setting can be a current clock setting for a DAS 100 in an online mode in which signals are communicated with coverage areas 108a, 108b. The current clock setting can be the clock setting used for providing switching signals to the switches 212, 214, 216 in the online mode of the DAS 100. The switching control engine 310 can identify the current clock setting and perform additional operations to optimize or otherwise update the current clock setting.

The process 700 further involves determining start or end times for respective downlink sub-frames transmitted via a downlink path of the distributed antenna system, as depicted in block 720. For example, the switching control engine 310 can receive or otherwise access data describing power measurements by the measurement receiver 302. The switching control engine 310 can identify a start time for a respective downlink sub-frame based on a power measurement indicating that a signal power in the downlink path 204 exceeds the threshold signal power. The switching control engine 310 can identify an end time for a respective downlink sub-frame based on a power measurement indicating that a signal power in the downlink path 204 drops from a level exceeding the threshold signal power to a level below the threshold signal power.

The process 700 further involves statistically determining a switching time adjustment based on switching time differentials between the clock setting and the respective start times, as depicted in block 730. For example, the switching control engine 310 can determine a switching time adjustment that is a mean or other statistical attribute of a set of sample switching time differentials, as described above with respect to FIGS. 5-6.

The process 700 further involves updating the clock setting based on the switching time adjustment, as depicted in block 740. For example, the switching control engine 310 can update the current clock setting $t_{clk,current}$ to an updated clock setting $t_{clk,updated}$ based on the function $t_{clk,updated} = t_{clk,current} + \Delta t_{adj}$. In some aspects, the switching control engine 310 can detect an end of a current TDD frame or sub-frame based on power measurements from the measurement receiver 302. The switching control engine 310 can generate switching signals for the switches 212, 214, 216 at intervals of $t_{clk,updated}$ after detecting the end of the current TDD frame or sub-frame.

Figure 9:
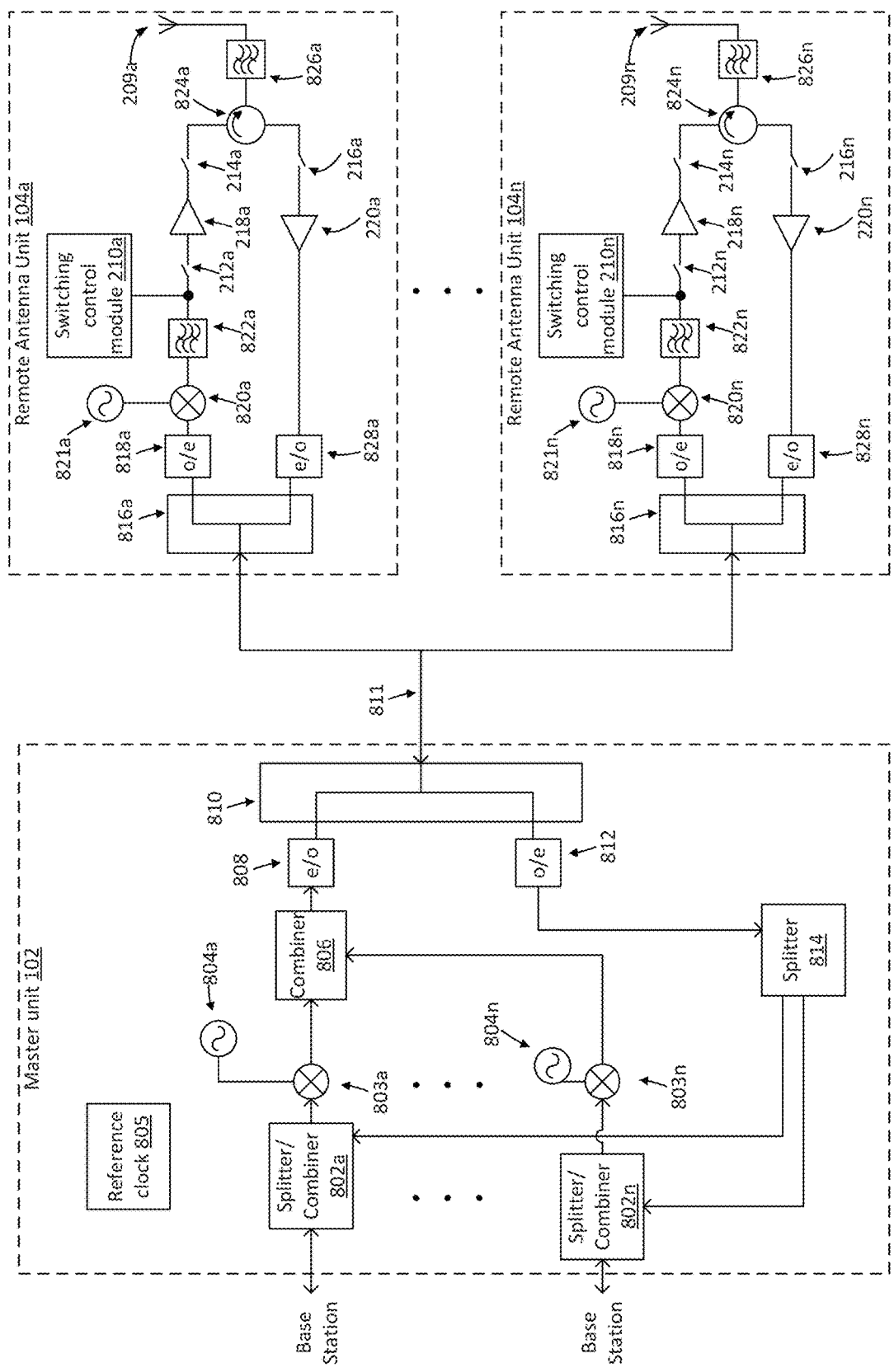
FIG. 9 is a schematic depicting examples of a master unit and remote antenna units for an optical TDD distributed antenna system that can utilize an optimized clock setting for a TDD switching sub-system according to one aspect of the present disclosure.

The TDD switching sub-system can be implemented in any suitable DAS 100 configured for TDD operations. For example, FIG. 9 is a schematic depicting examples of a master unit 102 and remote antenna units 104a-n for an optical TDD distributed antenna system that can utilize an optimized clock setting for a TDD switching sub-system according to one aspect.

The master unit 102 can include splitter-combiners 802a-n for isolating uplink and downlink signals communicated with base stations or other signal sources. The master unit 102 can also include mixers 803a-n and local oscillators 804a-n for frequency-shifting downlink signals to intermediate frequency ("IF") bands, as described in greater detail below. The master unit 102 can also include a combiner 806 for combining downlink signals from different operators for serial transmission to remote antenna units 104a-n. The master unit 102 can also include an electrical-to-optical converter 808 for converting the serialized electrical downlink signals into serialized optical downlink signals. The serialized optical downlink signals can be transmitted to the remote antenna units 104a-n via the optical communication link 811. The master unit 102 can also include an optical-to-electrical converter 812 for converting optical uplink signals received via the optical communication link 811 into serialized electrical uplink signals. The master unit 102 can also include a splitter 814 for separating the serialized electrical uplink signals into separate uplink signals for transmission to base stations or other receivers of uplink signals.

The remote antenna units 104a-n can include respective optical splitter-combiners 816a-n for isolating optical downlink signals from optical uplink signals. The remote antenna units 104a-n can also include respective optical-to-electrical converters 818a-n for converting optical downlink signals into electrical downlink signals. The remote antenna units 104a-n can also include respective mixers 820a-n and local oscillators 821a-n for frequency shifting downlink signals to RF frequency bands, as described in detail below. The remote antenna units 104a-n can also include respective bandpass filters 822a-n for attenuating unwanted frequency components of the RF downlink signals outputted by the mixers 820a-n. The remote antenna units 104a-n can also include switching control modules 210a-n and switches 212a-n, 214a-n, 216a-n that perform the same or similar functions with respect to the power amplifiers 218a-n and low noise amplifiers 220a-n as described above with respect to FIG. 2. The remote antenna units 104a-n can also include respective circulators 824a-n for coupling downlink signals from the downlink paths to the antennas 209a-n and for coupling uplink signals from the antennas 209a-n to the uplink paths. The remote antenna units 104a-n can also include respective electrical-to-optical converters 828a-for converting electrical uplink signals to optical uplink signals for transmission via the optical communication link 811.

Multiple telecommunication operators utilizing the DAS 100 can use a common optical communication link 811 between the master unit 102 and the remote antenna units 104*a*-*n*. In some aspects, the DAS 100 can support an "uncoordinated operator mode." In the uncoordinated operator mode, different operators using the DAS 100 do not coordinate with one another in switching between an uplink TDD mode and a downlink TDD mode.

The DAS 100 can be configured to reduce or eliminate uplink blocking by unsynchronized operators transmitting signals using adjacent frequencies. For example, downlink signals from multiple operators can be closely spaced within a frequency band (e.g., a few MHz). The mixers 803*a*-*n* and the local oscillators 804*a*-*n* of the master unit 102 can be used to frequency-shift downlink signals to IF bands. Frequency shifting the downlink signals to IF bands can separate downlink signals from uncoordinated operators use closely spaced frequencies for transmitting TDD signals. The mixers 820*a*-*n* and local oscillators 821*a*-*n* of the remote antenna units 104*a*-*n* can be used to frequency-shift the IF downlink signals back to RF bands for transmission. A reference clock 805 in the master unit 102 can be used for synchronizing the local oscillators 804*a*-*n*, 821*a*-*n*. In some aspects, the reference clock 805 can also be used for synchronizing the reference source 312 used by the switching control module 210. The reference clock 805 can be communicatively coupled to the local oscillators 804*a*-*n* via any suitable mechanism, such as a printed circuit board or other communication bus (not depicted in FIG. 9). Signals from the reference clock 805 can be communicated from the master unit 102 to the remote antenna units 104*a*-*n* via the optical communication link 811.

The foregoing description of aspects and features of the disclosure, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each example disclosed can be combined with any other example. The illustrative examples described above are given to introduce the reader to the general subject matter discussed here and are not intended to limit the scope of the disclosed concepts.

What is claimed is:

1. A switching control module for a time division duplexing (TDD) communications system comprising a master unit and at least one remote antenna unit that is communicatively coupled to the master unit by an uplink path and a downlink path, the module comprising:
    a processor coupled to a memory;
    wherein the processor is configured to send control signals to at least one switch based on switching times controlled by a clock setting, wherein the clock setting is determined by the processor as a function of an initial clock setting based on a downlink:uplink sub-frame ratio that is adjusted by a statistically based clock setting adjustment and a downlink path signal power measurement; and
    wherein the at least one switch is positioned in the TDD communications system and the control signals instruct the at least one switch to switch the TDD communications system between an uplink mode and a downlink mode.

2. The module of claim 1, wherein the downlink:uplink sub-frame ratio is determined by sampling a signal power of multiple downlink fames in the downlink path.

3. The module of claim 1, wherein the downlink:uplink sub-frame ratio comprises a ratio of:
    a) uplink sub-frames communicated by the master unit to at least one base station, to
    b) downlink sub-frames received by the master unit from the at least one base station.

4. The module of claim 1, wherein the downlink:uplink sub-frame ratio comprises a ratio of:
    a) uplink sub-frames communicated by the master unit to a plurality of base stations, to b) downlink sub-frames received by the master unit from the plurality of base stations.

5. The module of claim 1, further comprising:
    a measurement receiver configured for measuring a signal power in the downlink path; and
    a comparator device having an input coupled to the measurement receiver and an output coupled to the processor, wherein the comparator device is configured for comparing a threshold signal power with a power measurement received from the measurement receiver via the input and providing a signal to the processor via the output that is indicative of whether the power measurement exceeds the threshold signal power.

6. The module of claim 1, wherein the memory comprises a plurality of TDD configurations;
    wherein the processor selects the initial clock setting by selecting a first clock setting associated with a first TDD configuration from the plurality of TDD configuration
    based on the downlink:uplink sub-frame ratio; and
    wherein the processor calculates the clock setting adjustment statistically from a set of switching time differentials, wherein each switching time differential of the set of switching time differentials is a difference between a start of a respective downlink subframe as determined from the downlink path signal power measurement and a time at which a respective one of the control signals is provided to the at least one switch.

7. The module of claim 6, wherein the processor is configured determine the switching time adjustment by:
    determining start times or end times for respective downlink sub-frames transmitted via the downlink path, wherein the processor determines each start time or end time based on the signal power measured by a measurement receiver exceeding a threshold signal power; and
    statistically determining the switching time adjustment from multiple switching time differentials, wherein each of the switching time differentials comprises a respective difference between the initial clock setting and a respective start time or end time.

8. A method for controlling a time division duplexing (TDD) communications system comprising a master unit and at least one remote antenna unit that is communicatively coupled to the master unit by an uplink path and a downlink path, the method comprising:
    determining a clock setting as a function of an initial clock setting based on a downlink:uplink sub-frame ratio that is adjusted by a statistically based clock setting adjustment and a downlink path signal power measurement; and
    sending control signals to at least one switch based on switching times controlled by the clock setting;

wherein the at least one switch is positioned in the TDD communications system and the control signals instruct the at least one switch to switch the communications system between an uplink mode and a downlink mode.

9. The method of claim 8, wherein the downlink:uplink sub-frame ratio is determined by sampling a signal power of multiple downlink fames in the downlink path.

10. The method of claim 8, wherein the downlink:uplink sub-frame ratio comprises a ratio of:
   a) uplink sub-frames communicated by the master unit to at least one base station, to b) downlink sub-frames received by the master unit from the at least one base station.

11. The method of claim 8, wherein the downlink:uplink sub-frame ratio comprises a ratio of:
   a) uplink sub-frames communicated by the master unit to a plurality of base stations, to
   b) downlink sub-frames received by the master unit from the plurality of base stations.

12. The method of claim 8, further comprising:
   measuring a signal power in the downlink path with a measurement receiver; and
   comparing a threshold signal power with a power measurement received from the measurement receiver and providing a signal to a processor that is indicative of whether the power measurement exceeds the threshold signal power.

13. The method of claim 8, further comprising:
   selecting the initial clock setting by selecting a first clock setting associated with a first TDD configuration from a plurality of TDD configuration stored in a memory based on the downlink:uplink sub-frame ratio; and
   calculating the clock setting adjustment statistically from a set of switching time differentials, wherein each switching time differential of the set of switching time differentials is a difference between a start of a respective downlink sub-frame as determined from the downlink path signal power measurement and a time at which a respective one of the control signals is provided to the at least one switch.

14. The method of claim 13, calculating the clock setting adjustment comprises:
   determining start times or end times for respective downlink sub-frames transmitted via the downlink path, wherein the processor determines each start time or end time based on the signal power measured by a measurement receiver exceeding a threshold signal power; and
   statistically determining the switching time adjustment from multiple switching time differentials, wherein each of the switching time differentials comprises a respective difference between the initial clock setting and a respective start time or end time.

15. A time division duplexing (TDD) communications system, the system comprising:
   a master unit;
   at least one remote antenna unit that is communicatively coupled to the master unit by an uplink path and a downlink path;
   at least one switch positioned in the TDD communications system and the control signals instruct the at least one switch to switch the communications system between an uplink mode and a downlink mode; and
   a switching control module comprising a processor coupled to a memory;
   wherein the processor is configured to send control signals to at least one switch based on switching times controlled by a clock setting, wherein the clock setting is determined by the processor as a function of an initial clock setting based on a downlink:uplink sub-frame ratio that is adjusted by a statistically based clock setting adjustment and a downlink path signal power measurement.

16. The system of claim 15, wherein the memory comprises a plurality of TDD configurations;
   wherein the processor selects a # the initial clock setting by selecting a first clock setting associated with a first TDD configuration from the plurality of TDD configuration based on the downlink:uplink sub-frame ratio; and
   wherein the processor calculates a the clock setting adjustment statistically from a set of switching time differentials, wherein each switching time differential of the set of switching time differentials is a difference between a start of a respective downlink sub-frame as determined from the downlink path signal power measurement and a time at which a respective one of the control signals is provided to the at least one switch.

17. The system of claim 15, wherein the downlink:uplink sub-frame ratio is determined by sampling a signal power of multiple downlink frames in the downlink path.

18. The system of claim 15, wherein the switching control module is located in the at least one remote antenna unit.

19. The system of claim 15, wherein the downlink:uplink sub-frame ratio comprises a ratio of:
   a) uplink sub-frames communicated by the master unit to at least one base station, to
   b) downlink sub-frames received by the master unit from the at least one base station.

20. The system of claim 15, wherein the downlink:uplink sub-frame ratio comprises a ratio of:
   a) uplink sub-frames communicated by the master unit to a plurality of base stations, to
   b) downlink sub-frames received by the master unit from the plurality of base stations.

\* \* \* \* \*